United States Patent [19]

Wack

[11] 4,280,686
[45] Jul. 28, 1981

[54] RAIL END MOUNTING BRACKET

[76] Inventor: David T. Wack, Rte. 1, Box 58, Smallwood Rd., White Plains, Md. 20695

[21] Appl. No.: 88,153

[22] Filed: Oct. 25, 1979

[51] Int. Cl.³ .......................................... E04H 17/14
[52] U.S. Cl. .................... 256/65; 403/232.1; 403/189
[58] Field of Search ...................... 403/232.1, 262, 199, 403/189, 187; 256/65; 182/228; 108/109; 52/702; 248/300, 216.1

[56] References Cited

U.S. PATENT DOCUMENTS

| 949,075 | 2/1910 | Hulett | 256/65 |
|---|---|---|---|
| 1,649,206 | 11/1927 | Yawman | 182/228 |
| 1,680,032 | 8/1928 | Anderson | 182/228 |
| 1,829,009 | 10/1931 | Madsen | 108/109 |
| 1,920,520 | 8/1933 | Nord | 248/300 |
| 2,359,109 | 9/1944 | Hormes | 108/109 |
| 2,608,386 | 8/1952 | Hart | 256/65 |
| 2,809,405 | 10/1957 | McElwee | 52/702 |

*Primary Examiner*—Andrew V. Kundrat
*Attorney, Agent, or Firm*—Thomas J. Greer, Jr.

[57] ABSTRACT

A fence railing end connector formed of a strip of sheet metal. A wave or kink is formed intermediate the ends of the connector, the wave forming a ledge to support a railing end. The strip is first attached at its mid portion to an end of the railing, the strip ends then attached as by nailing to an upright fence post.

3 Claims, 2 Drawing Figures

RAIL END MOUNTING BRACKET

This invention relates to an end connector for attaching the end of a fence railing to an upright fence post.

In the construction of wooden fences, it is necessary to connect the ends of horizontally extending railings which are between upstanding fence posts. A variety of brackets or other connectors are known to accomplish this or a similar purpose. For example, U.S. Pat. No. 233,696 issued to Raisor discloses a bracket for connecting wooden joists between headers or runners. U.S. Pat. No. 625,427 issued to Stewart also shows a bracket which would exhibit a similar utility. While not for the identical purpose, U.S. Pat. No. 3,222,831 issued to Pritchard shows a sheet metal connector for attaching panelling or siding to a wall, again being of sheet metal bracket form. Further, U.S. Pat. No. 2,666,238 issued to Hagedorn shows a sheet metal bracket for effecting a similar connection. Still futher, U.S. Pat. No. 2,990,590 issued to Graveley shows an arrangement for connecting wooden members employing sheet metal brackets. While not for the purpose of connecting wooden members, U.S. Pat. No. 3,938,297 issued to Sato shows a bracket for connecting a horizontal runner member to a vertically extending post or the like.

While these prior art brackets and connectors have apparently exhibited utility, none exhibits the advantages of the present invention.

According to the practice of the present invention a specially formed bracket of sheet metal is first attached at its mid portion, as by nailing, to the end of a fence railing member. The bracket includes a ledge upon which an end of the railing rests. Then the railing, with the bracket attached, is placed in perpendicular relation to an upstanding fence post, and additional nails used to attach the ends of the bracket to the fence post. The bracket or connector of this invention exhibits simplicity and ease of use on site installations but also may be attached to the ends of the fence railing at the factory or other central assembly location.

IN THE DRAWINGS

Figure 1:
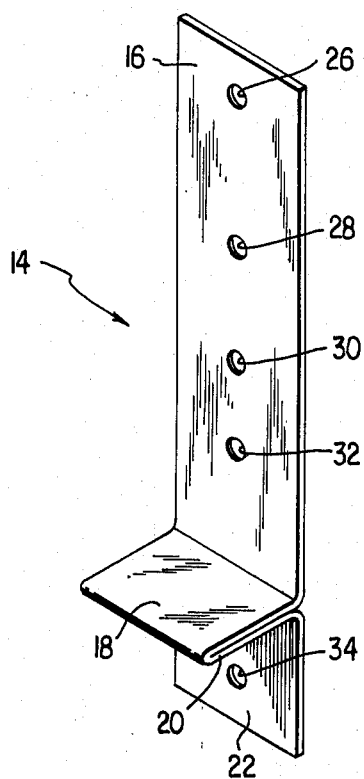
FIG. 1 represents a perspective view of the sheet metal bracket or connector of this invention.

Referring now to the drawings, the numeral 10 denotes a vertically extending wooden post of generally square cross-section. It will be understood that other cross-sections may be employed if desired. The numeral 12 denotes a horizontally extending wooden railing or runner, such as a 2×3 runner or a 2×4 runner. The numeral 14 denotes generally the sheet metal bracket of this construction, the bracket including a first panel portion 16, a second panel portion 18, a third panel portion 20 and a fourth panel portion 22. Portions 18 and 20 may be regarded as a compressed square wave along the length of the sheet metal strip 14, the wave defining a support ledge. One end of runner 12 rests on the top of panel portion 18, panel portions 18 and 20 combined being of generally U-shape in longitudinal cross-section of the strip, panel portions 18 and 20 generally being in surface contact, as indicated. The ends of the generally U-shaped wave (ledge) defined by panel portions 18 and 20 are integrally attached to the strip 14. In practice, the bracket may be fabricated by bending at a location intermediate the ends of sheet metal strip workpiece 14, which is originally flat, so as to define panel portions 18, 20 and the resultant ledge. Apertures 26, 28, 30, 32 and 34 are placed along the length of the bracket as indicated, preferably prior to bending of the strip. It is preferable that the panel portions 16 and 22 be coplanar, so as to thereby be positioned flat against the flat side of the post 10 where attachment is to be made. Fasteners such as nails 38 and 40 pass through the end apertures 26 and 34, respectively, while fasteners such as nails 42, 44 and 46 pass through, respectively, apertures 28, 30 and 32.

Figure 2:
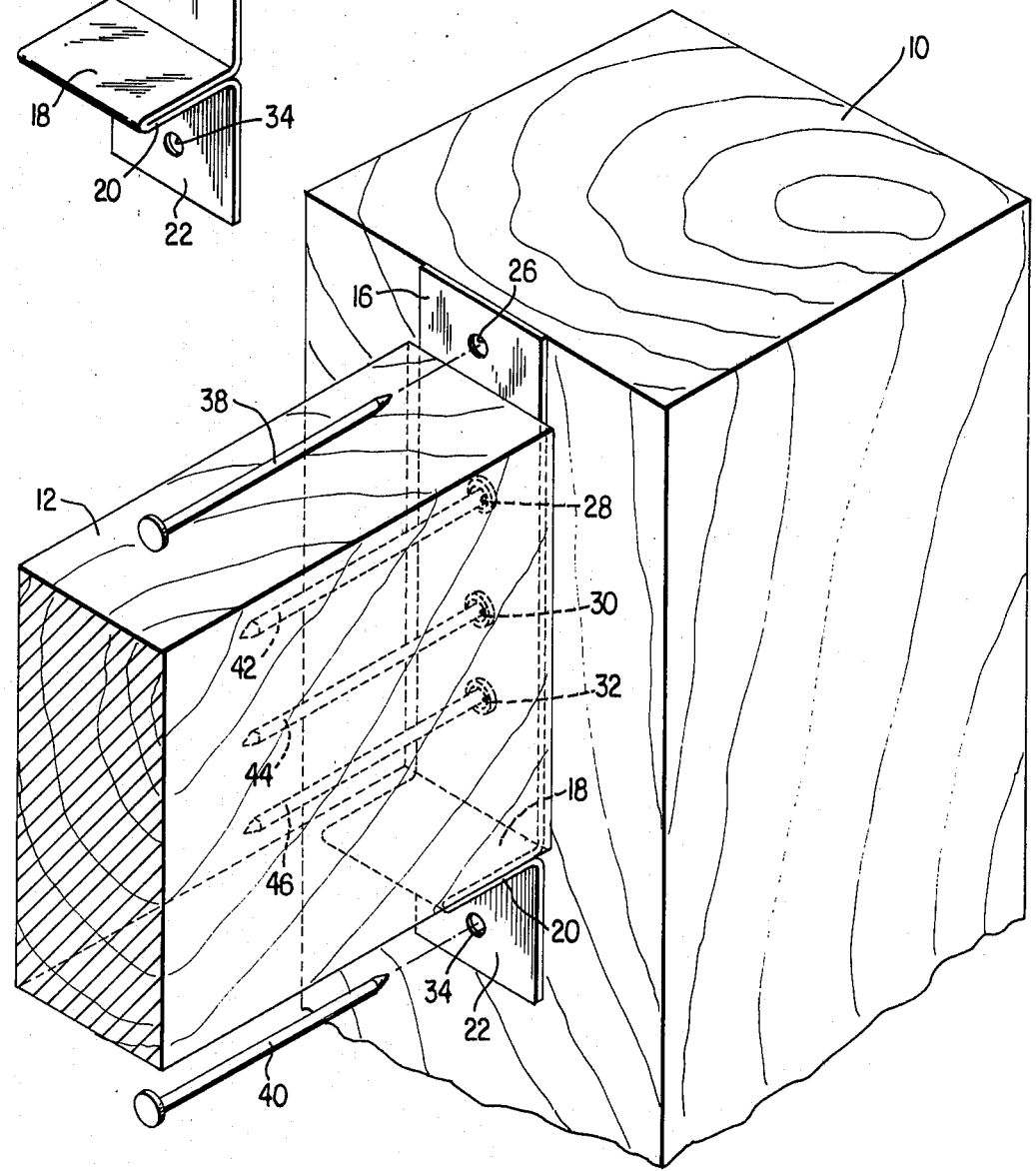
FIG. 2 shows the bracket coupling a horizontally extending fence railing to a vertically extending post.

To construct the joint assembly shown at FIG. 2, it is convenient to first attach bracket 14 to the end of railing 12. The bracket is placed on the end of railing 12 in a manner indicated at FIG. 2, and the nails or other fastening elements driven in. In the case of a 2×3 railing, it has been found only necessary to employ two nails, such as nails 44 and 46, while if a 2×4 railing 12 is selected, it has been found necessary only to employ two nails spaced further apart, such as nails 42 and 46.

After the bracket has been attached to the end of railing 12, the latter is placed in the desired relation to the post, that is to say, at a desired horizontal location relative to the post, and nails 38 and 40 then driven in apertures 26 and 34, respectively. Panel 16 may be regarded as an upper bracket portion located above the uppermost surface or railing 12, while panel 22 may be regarded as a lower bracket portion below the railing support ledge. This completes the assembly. The bracket may be attached to the end of railing 12 at a central place of fabrication, such as a factory, with the final assembly taking place in the field, or, alternatively, the bracket may be assembled at the fence site to the end of railing 12, and the nails 38 and 40 then driven. While one nail 38 through aperture 26 would, in theory, be sufficient to support the weight of the railing 12, it has been found that additional nail 40 is required to prevent rotation of the rail 12 about an axis displaced but parallel to the railing axis.

While shown in the form of a rectangular strip of sheet material, such as sheet metal, which is bent to form the U-shaped ledge, the bracket 14 may be extruded, as from aluminum or reinforced plastic. The ledge defined by panel portions 18 and 20 could be defined by a single panel. The longitudinal cross-section of the ledge would still be U-shaped.

I claim:

1. A fence railing end connector bracket for connecting the end of a fence railing to a post, said connector defined by a flat strip of sheet material of generally rectangular form having an intermediate ledge extending at right angles to its plane, said ledge being defined by a wave projecting from said strip transversely of the length of said strip, said wave being of generally U-shape in longitudinal cross-section, the wave being integral with said strip, said strip having flat attaching portions on opposite sides of said wave, one of said attaching portions having a set of nail receiving apertures intermediate thereof for nailing said connector to a fence rail end, and both of said attaching portions having nail receiving apertures adjacent the terminal ends thereof for nailing said connector to a fence post above and and below said wave.

2. The connector bracket of claim 1 wherein the bracket is attached to a fence post railing end by fasteners extending from the bracket into the railing end, and wherein the bracket is attached to a fence post by fasteners extending from said upper and lower bracket portions into the post.

3. The fence and railing assembly of claim 2 wherein said upper and lower bracket portions are coplanar.

* * * * *